Nov. 21, 1961 A. RETTIG 3,009,685
APPARATUS FOR MIXING, KNEADING AND HOMOGENIZING
Filed May 28, 1959

INVENTOR:
AUGUST RETTIG
BY
ATT'YS

United States Patent Office 3,009,685
Patented Nov. 21, 1961

3,009,685
APPARATUS FOR MIXING, KNEADING AND HOMOGENIZING
August Rettig, Ludwigshafen (Rhine), Gartenstadt, Germany, assignor to Badische Anilin- & Soda-Fabrik Aktiengesellschaft, Ludwigshafen (Rhine), Germany
Filed May 28, 1959, Ser. No. 816,564
Claims priority, application Germany May 29, 1958
4 Claims. (Cl. 259—7)

This invention relates in general to apparatus for the mixing, kneading and homogenizing of solid to highly viscous substances under pressure, usually with the application or removal of heat. A particularly useful embodiment of the invention relates to the treatment of granular to highly viscous, pasty or kneadable thermoplastic materials which are subjected to a pressurized mixing and then extruded.

For the processing of granulated to viscous substances, especially thermoplastic materials, there have hitherto been employed screw presses provided wih one or more elongated spindle-shaped screws surrounded by a chamber which is substantially cylindrical or which is built up of a plurality of cylindrical chambers coaxial with and encircling the screw spindle. In such kneaders or mixers, the actual kneading, mixing and conveying screw means thus moves or rotates in the elongated direction of the cylindrical chamber, thereby forcing the treated material to flow through the annular passage between the screw and the inner walls of the cylindrical chamber. The desired change of state of a thermoplastic material from the more solid state into the more liquid state is above all dependent upon the annular size or space defined by the screw and the inner walls of the cylindrical chamber as boundary surfaces forming the path along which the material flows. Melting or liquefying of material takes place in this flow path usually by indirect heat exchange with the rigid outer surfaces of the cylindrical chamber or housing of the apparatus. The change of state is however also dependent upon the friction created and the speed of flow of material along these boundary surfaces.

In order to evaluate the characteristics and efficiency of this type of processing method, and its corresponding apparatus, it is possible to introduce as a comparative magnitude the ratio of the boundary surface F of a section of the flow path to the amount of material Q which moves past this section in a unit time. In the case of rotation-symmetrical mixing and conveying zones, successive equal sections F of the flow path can be expressed as an angular measurement relative to the distance $r$ of the section from the central axis of rotation of the particular mixing and conveying means. It is justifiable to designate this ratio of boundary surface to amount of material as the "specific boundary surface" $F_s = F/Q$.

In the processing methods previously employed for mixing, kneading and homogenizing highly viscous substances, particularly in apparatus having a screw spindle enclosed coaxially within a cylindrical working chamber, the specific boundary surface $F_s$ is the same in each successive equal section F. In elongated screw machines with conical housings providing a gradually increasing annular space coaxially along the screw conveyor, the specific boundary surface $F_s$ is still practically equal in each successive section, or in any case, it is of the same order and magnitude.

It will also be found that for each successive section of the flow path of the material being treated, prior machines have approximately equal and at least not substantially different relative flow speeds of material with respect to the boundary surface in each section.

In mixing and liquefying thermoplastic materials in screw machines or processing such materials in screw extrusion presses, the boundary surfaces which transmit heat and the angular speed of rotation of the screw decisively influence the output of such machines. In other words, the boundary surfaces and the relative movement of the particles or viscous mass of treated material by rotary movement of the screw determine the thermal relationship existing in the machine and consequently have a decisive effect on the quality of the product. For example, in machines provided with especially long conveyor screws, an accumulation of heat is often established which leads to local overheating of parts of the machine and of the substance being processed. The color of the treated substance is thereby often changed unfavorably or the substance is decomposed or otherwise deteriorated.

In known machines, especially for mixing, kneading, mastication and coloring of plastics, technical development has led to ever larger and longer conveying screws and to higher pressures. Apart from the larger space requirement of these machines, there is always a considerable expenditure for mechanical means to equalize pressure in the bearings of the screw caused by the high axial pressure occurring in the screw spindle. Throughput of such machines is often limited in order to avoid damage to the product as will be recognized from the discussion above. In addition, the screw spindle and the long cylindrical chamber associated therewith in these prior machines can only be cleaned with difficulty when it is desired to change the product or its color.

One object of the present invention is to provide apparatus for pressurized mixing of solid to highly viscous materials, especially thermoplastics, whereby a high throughput can be obtained with a wide range of carefully controlled temperatures and pressures.

Another object of the invention is to provide apparatus wherein substances being mixed and homogenized are moved or conveyed with respect to boundary surfaces along a spiral path of flow such that the relative flow speed can be continuously increased and decreased over a wide range.

Still another object of the invention is to provide apparatus for pressurized mixing whereby it is relatively easy to introduce such materials as dyestuffs, pigments, fillers, stabilizers and the like into the flow path of the viscous material being treated.

Yet another object of the invention is to provide apparatus whereby gases being formed in the pressurized mixing and conveying of highly viscous materials, especially thermoplastics, can be readily removed during the pressurized treatment.

Another object of the invention is to provide a screw press and extruder for processing granular to viscous substances such as thermoplastics whereby space requirements can be kept to a minimum and the apparatus itself is more easily cleaned and maintained.

A particular object of the invention is to provide a screw press of the type hereinafter described wherein mechanical stresses and overheating can be avoided while still permitting a more efficient operation.

These and other objects and advantages of the invention will become more apparent upon a consideration of the following detailed description together with the accompanying drawing wherein.

Figure 1:
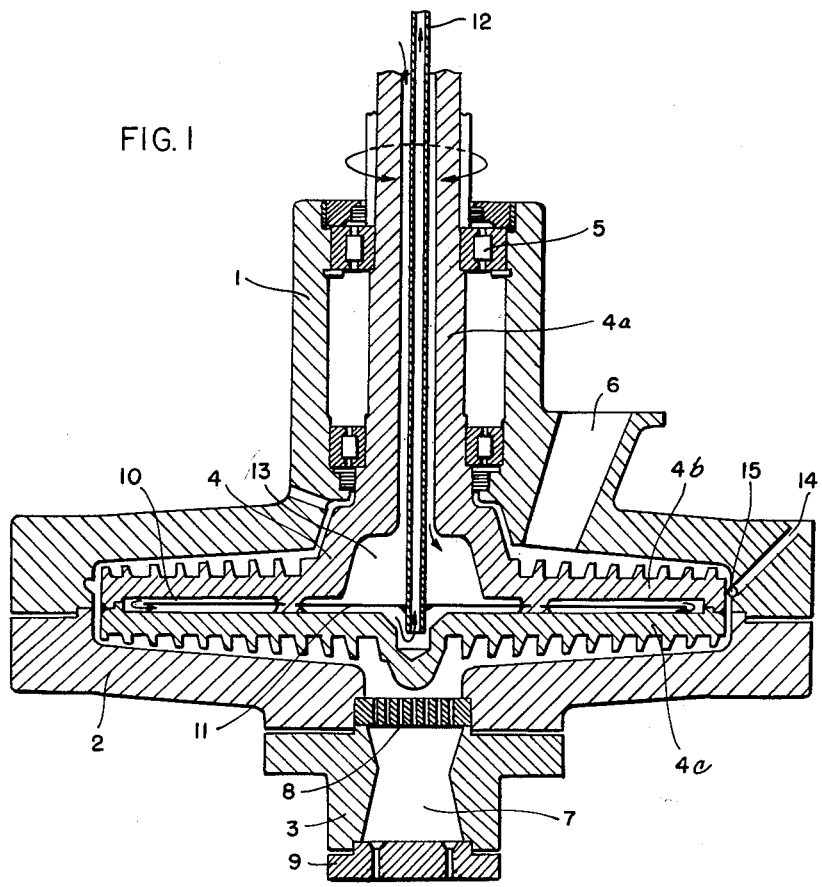
FIG. 1 is a vertical cross-sectional view of one apparatus constructed in accordance with the invention.

It has now been found in accordance with the invention that solid to highly viscous substances can be subjected to an improved mixing, kneading and homogenizing by moving the substance with mixing under pressure in a continuous treatment path comprising a first circularly enclosed mixing zone in which the substance being treated is moved from the central axis of said zone to its outer periphery in a spirally continuous path with a constantly increasing speed and decreasing pressure and a second circularly enclosed mixing zone in which said substance is further moved or conveyed and mixed from the outer periphery of said zone to its central axis in another spirally continuous path with a constantly decreasing speed and increasing pressure, the spiral path of each mixing zone being interconnected at its periphery. The temperature of the treated material is preferably regulated throughout its movement through the mixing zones by indirect heat exchange with either a heating or cooling fluid medium. For further regulation of the temperature, heat can be transferred by indirect heat exchange between the mixing zones, preferably by means of a fluid heat exchange medium flowing between each of said mixing zones and in indirect heat exchange therewith. Solid and/or liquid additives to be incorporated with the viscous material being processed can be advantageously introduced at the periphery of the interconnected mixing zones which corresponds to the point of maximum flow speed and minimum pressure. Gases escaping from the viscous material can be removed at the same point.

Mixing apparatus for the purposes of the invention includes a circular disc conveying means rotatably mounted on a central axis within and relative to a circular housing, the disc having its opposite sides and outer peripheral edge spaced inwardly from two oppositely disposed circular walls and joining rim of the circular housing, respectively, to define the boundary surfaces of two continuous interconnected mixing zones on either side of said disc. These mixing zones are proportioned such that they have a substantially greater diameter, i.e. as measured outwardly from the central axis of rotation, than their width as measured between the inner walls of the housing and the disc surfaces. At least one of the boundary surfaces of each mixing zone contains spiral screw means thereon adapted to move a solid to highly viscous substance with mixing under pressure in a continuous spiral path outwardly from the central axis over the boundary surface of one mixing zone, around the peripheral edge of the disc and inwardly toward the central axis over the boundary surface of the other mixing zone. Means are provided to introduce the material to be mixed adjacent the central axis of the first outwardly conveying and mixing zone, and the mixed substance is then removed by discharging means from the second inwardly conveying and mixing zone, preferably at a point along the central axis thereof. The width of each mixing zone preferably decreases outwardly from the central axis so that pressure upon the mixed substance decreases outwardly to a point of minimum pressure at the outer periphery and between the outer edge surface of the disc and the inner rim surface of the housing. However, a wide range of pressure relationships can be adapted to specific materials by varying the width of the mixing zones, or it may be of constant width. If desired, a plurality of bores or channeled openings can be provided in or adjacent to the rim of the housing, and this embodiment is especially useful for the removal of gases from the material being mixed or for the addition thereto of various solid or liquid or even gaseous additives. These bores or openings are preferably interconnected by an annular groove where they enter along the inner rim surface of the circular housing. It is also very advantageous to employ a relatively thin walled disc enclosing a hollow core through which a fluid heat transfer medium can be passed in order to heat or cool the outer surfaces of the disc upon which the mixed material is conveyed. By inserting a central partition in the hollow core of the disc, the fluid heat transfer medium can be caused to flow first along one side of the disc and then along the other side in a continuous path either in co-current or counter-current flow with respect to the material being mixed. The fluid heat transfer medium is most conveniently introduced into the hollow core of the disc and removed therefrom by conduit means within a shaft upon which the disc is centrally mounted for rotatable movement with respect to the housing.

Other modifications in the construction of the mixing device of the invention will be apparent from the following description of one embodiment illustrated by way of example in the accompanying drawing.

As shown in FIG. 1 a multipart housing comprising a long cylindrical neck-shaped section or outer sleeve 1, a short double plate section of substantially greater diameter 2, and a discharging short-necked section 3 is provided with a conveying means 4 which is rotatably mounted on a central axis therein. The conveyor means 4 comprises a hollow shaft 4a which is mounted by a roller bearing 5 in the neck-shaped outer sleeve 1 of the housing, and a disc preferably provided on both sides with spiral screwthreads and consisting of two sections 4b and 4c firmly connected together. The disc-shaped part of the conveyor means 4 is also made hollow between sections 4b and 4c so that a heat-carrying fluid medium can enter through the hollow shaft into the region of maximum internal disc diameter.

Figure 3:
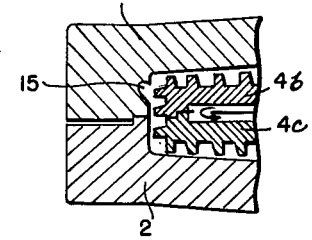
FIG. 3 is a partial view taken from FIG. 1 and illustrates an alternative construction of the disc-shaped conveying element of the apparatus.

Between the outer surface of the screwthreaded discs 4b and 4c and the inner surface of the plate section 3 of the housing, only a narrow space is provided which defines the flow path of the material being treated. The size of this space is either the same throughout or, depending on the pressure relationships desired, may become smaller or larger outwardly from the central axis, either continuously or in stages. The disc screws 4b and 4c are driven from the free end of the hollow shaft 4a by conventional means (not shown). In the position shown, the substance to be processed is supplied through the funnel-shaped opening 6 of the housing to the upper side of the disc screw in the neighborhood of the central axis of rotation. By rotation of the screw, the substance is conveyed outwardly by the screwthread. Having regard to the continuous supply of the substance, the material which is conveyed with simultaneous mixing and kneading to the outer edge of the disc and round the same continues its movement on the opposite side of the disc 4c under the pressure of the following mass. The outer edge of the screw may be smooth or may likewise have a screw cut as it is to be seen in FIG. 3, even if less deep. The direction of the pitch of the screwthread on the underside 4c is chosen so that with constant direction of rotation of the disc, conveyance now takes place inwardly from the peripheral rim to the central axis.

The substance being processed then passes out from the screwthread at about the middle of the disc and is forced out through the part 3 of the housing, preferably through a nozzle-like opening 7 arranged therein. A perforated disc 8 may be inserted in the opening 7 to provide a plurality of passages or channels whose size can be regulated to vary the pressure on the treated substance within the disc. The mouth of the opening 7 is partly closed by means of a perforated plate 9 in order to finish off the material being processed with a definite shape and if desired with the interposition of other conventional apparatus means. After removal of the cover-like part 2 of the housing, it is possible to disengage the shaft 4a from its driving mechanism and to draw off the disc screw 4 from the housing. The working spaces in the apparatus are thus easily accessible and can then be cleaned conveniently.

Depending on the purpose of the processing method the mixing and kneading output to be obtained by means of the disc screw and also the specific properties of the substance to be processed, it is necessary to withdraw or supply heat sufficiently quickly from the material being treated. Besides the conventional heat exchange through the outer wall of the housing, which need not be further described here since it is commonly applied to elongated screw presses, a liquid, vaporous or gaseous heat carrier may be led into the disc screw for temperature control. For this purpose, there are provided in the interior of the disc screw, for example by partitions or guide plates 10 and 11, and in the interior of the hollow shaft 4a by an interposed hollow concentric tube 12, channels which prescribe a path for the heat-transferring medium.

The case shown in the drawing is one in which a cooling of the substance being processed is to be provided. The cooling liquid flows through the outer annular space of the hollow shaft first into the upper hollow chamber 13 of the disc screw. It thereby cools the screw bearing 5 and the inlet zone in the region of the funnel 6. The cooling liquid then takes the path to the outer edge zone or rim of the hollow space around the disc screw, flows beneath the guide plates 10 and 11 back to the central axis and leaves the hollow shaft 4a through the interior of tube 12. If heat is to be supplied to the substance being processed, for example when using the arrangement as an extrusion press for thermoplastic masses, a suitable heat-carrying medium is introduced through the tube 12, flows in counter-current to the direction of conveyance of the thermoplast, first at high temperature at the point of discharge at the opening 7 and after preheating the inlet zone of the disc screw in the neighborhood of the funnel 6 leaves through the outer annular channel between the tube 12 and the hollow shaft 4a. If the said arrangement is operated in the processing of thermoplasts without a heating or cooling medium, the kneading or frictional heat produced by the work introduced flows from the underside 4c of the disc screw into the upper part 4b and there helps to preheat the thermoplastic mass.

The following changes of state are available for the substance being processed in the apparatus along the path from the inlet opening 6 to the discharge opening 7: With a constant pitch of the spiral screwthreads and, without regard to the screw profile, with parallel boundary surfaces between the upper and lower surfaces of the screw on the one hand and the housing wall on the other hand, the volume of the mixing and kneading chamber increases in the individual screwthreads as the square of the distance from the axis of rotation. The pressure set up behind the inlet opening 6 in the screwthread decreases to a corresponding extent in the outwardly-directed treatment path. This decrease in pressure is considerable and substantially promotes the degassing of the substance being treated. In the neighborhood of the edge zone of the disc screw, the housing has one or more bores or channels 14 through which the gas escaping from the kneaded material can be withdrawn. The bores 14 may be connected with each other by a groove 15 provided in the inner wall of the housing which may extend for example over the entire circumference.

In the flow relationships described it is not essential to accelerate the degassing of the material in the neighborhood of the greatest circumference of the disc screw by the use of a vacuum pump applied to the bores 14. Under the said conditions, the degassing occurs especially completely if the passage at the outer edge of the disc screw is constricted and the material passes this point as a thin film.

The heat exchange of the substance with the boundary surface may similarly increase on the upper side of the disc screw from the inside to the outside as about the square of the distance from the axis and may therefore be variably adapted to the treatment path without difficulty to a greater extent than by processing methods and apparatus hitherto known. After the conveyance of the substance being treated around the outer edge of the disc, changes in state of substance being processed take place in the reverse order and in about the same order of magnitude as in the screwthreads on the upper side of the disc.

In the working up of thermoplastic materials it is sometimes necessary to incorporate suitable stabilizers and/or lubricants, dyestuffs, pigments, fillers and the like into the raw material, or the latter is to be colored during the processing. Such additives or color pigments are especially quickly absorbed and homogeneously enclosed in the mass traversing the treatment path if introduced into the treatment chamber about in the region of the maximum peripheral speed or of minimum pressure, for example through bores 14 or similarly located openings.

The mixing and kneading power, varying within wide limits, to be supplied to the material being treated and also the said steep drop in pressure and re-establishment of pressure may be additionally varied by choice of the gap width between the profile of the screw section and the wall of the housing, by smaller or greater gap widths at the outer edge of the discs 4b, 4c, and also by variations in pitch of the screw section on the upper and/or lower side of the disc. Starting from the said possibilities of square changes in state on the upper and lower side of the screw, the through-flow relationships of the normal cases can be diminished or even increased by gradually different use of smaller or larger gap widths and by differently increasing screw profile sections.

Figure 2:
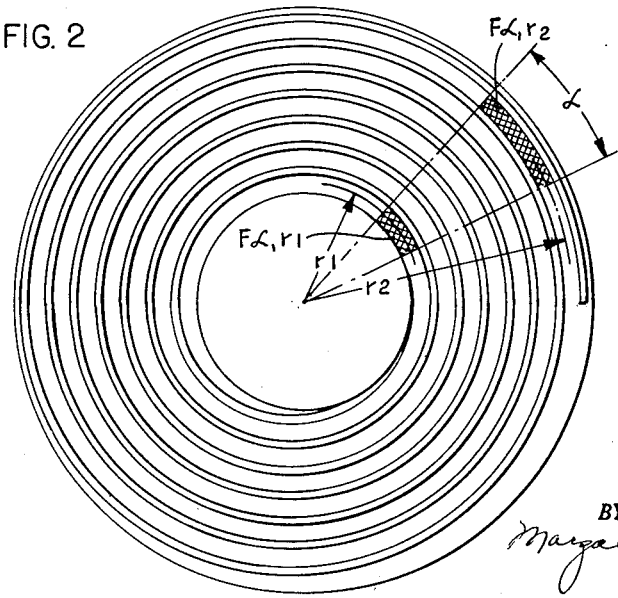
FIG. 2 is a top plan view in schematic form of a disc-shaped conveying means, illustrating the flow path of a material being treated in accordance with the invention.

Any of the thermoplastic materials which are ordinarily processed in screw machines or screw extruding presses can be treated with highly improved results by means of the apparatus of the present invention. Such materials are ordinarily introduced into the screw press in a granular state and gradually converted into a highly viscous state with mixing, kneading and homogenizing. It will be obvious from the construction of the apparatus of the invention as shown in FIG. 1 and the mathematical relationships presented in FIG. 2 that the flow speed of material is considerably increased outwardly from the central axis of the disc and then likewise decreased as the material flows back to the center. At the same time, the pressure in each of the mixing zones can be decreased outwardly from the central axis so that at the point of maximum speed and minimum pressure at the periphery of the mixing zones, gases can be readily removed from the viscous thermoplastic. At the same time, various additives including dyestuffs, pigments, fillers, lubricants, stabilizers and the like can be added to the viscous mass and very finely dispersed therein to obtain a homogeneous mixture of uniform quality and composition. Heat required for the process can be rapidly provided or heat generated by the plastic material can be rapidly withdrawn because of the relatively large heat transfer surfaces provided by the apparatus of the invention. Quality control is thereby substantially improved and local overheating of the apparatus can be avoided.

According to the said process, plastics may be kneaded and masticated at relatively low temperatures so that very high specific kneading energies are introduced into the material being treated. The process has proved especially suitable in the improvement or refining of polyethylene. It has also been established that impact-resistant polystyrene is considerably improved in its mechanical properties by the use of the process.

The invention is hereby claimed as follows:

1. A mixing apparatus for solid to highly viscous substances which comprises a circular disc means mounted on a shaft for rotation about a central axis within and relative to a circular housing, said disc means having its opposite sides and outer peripheral edge spaced inwardly from two oppositely disposed circular walls and joining rim of the circular housing, respectively, to define the boundary surfaces of two continuous interconnected mixing zones on either side of said disc, said mixing zones having a diameter substantially greater than the width thereof, spiral screw conveying means on at least one of the boundary surfaces of each of said mixing zones adapted to move a solid to highly viscous substance with mixing under pressure in a continuous spiral path outwardly from the central axis over the boundary surface of one mixing zone, around the peripheral edge of the disc and inwardly toward the central axis over the boundary surface of the other mixing zone, means to introduce the substance to be mixed adjacent the central axis of the first outwardly conveying mixing zone, and means to remove the mixed substance from the second inwardly conveying mixing zone.

2. A mixing apparatus as claimed in claim 1 wherein said joining rim between the two oppositely disposed circular walls of said circular housing is provided with at least one gas-conducting bore for removal of a gas from the material being mixed at a point in the neighborhood of the peripheral edge of said disc.

3. A mixing apparatus as claimed in claim 1 wherein said joining rim between the two oppositely disposed circular walls of said circular housing is provided with a plurality of gas-conducting bores for removal of a gas from the material being mixed at a point in the neighborhood of the peripheral edge of said disc, said bores being interconnected by a groove in the inner circumferential wall of said housing.

4. A mixing apparatus as claimed in claim 3 wherein the inner surface of said joining rim and the peripheral edge of said disc are spaced a short distance apart to provide a constricted passageway in which the material being mixed is compressed to a film sufficiently thin to substantially expel gases contained therein outwardly through said bores.

References Cited in the file of this patent

UNITED STATES PATENTS

| | | |
|---|---|---|
| 434,652 | Blumer | Aug. 19, 1890 |
| 1,076,297 | Van M. De Lummen | Oct. 21, 1913 |
| 1,711,154 | Michael | Apr. 30, 1929 |